(12) United States Patent
Suda

(10) Patent No.: US 7,797,490 B2
(45) Date of Patent: *Sep. 14, 2010

(54) MEMORY CARD AUTHENTICATION SYSTEM, MEMORY CARD HOST DEVICE, MEMORY CARD, STORAGE AREA SWITCHING METHOD, AND STORAGE AREA SWITCHING PROGRAM

(75) Inventor: Takaya Suda, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 167 days.

This patent is subject to a terminal disclaimer.

(21) Appl. No.: 12/100,437

(22) Filed: Apr. 10, 2008

(65) Prior Publication Data

US 2008/0195816 A1 Aug. 14, 2008

Related U.S. Application Data

(63) Continuation of application No. 11/537,766, filed on Oct. 2, 2006, now Pat. No. 7,401,183, which is a continuation of application No. 10/647,336, filed on Aug. 26, 2003, now Pat. No. 7,143,237.

(30) Foreign Application Priority Data

Aug. 26, 2002 (JP) ............................ P2002-245863

(51) Int. Cl.
 G06F 12/00 (2006.01)
 G06K 19/067 (2006.01)
(52) U.S. Cl. ...................................... 711/115; 711/170
(58) Field of Classification Search ................. 711/115, 711/170; 235/492
See application file for complete search history.

(56) References Cited

U.S. PATENT DOCUMENTS

| 4,654,787 | A | 3/1987 | Finnell et al. |
| 5,454,096 | A | 9/1995 | Otsuka et al. |
| 5,454,103 | A | 9/1995 | Coverston et al. |
| 6,182,159 | B1 | 1/2001 | Urabe |
| 6,226,202 | B1 | 5/2001 | Kikuchi |
| 6,612,490 | B1 | 9/2003 | Herrendoerfer et al. |
| 6,732,230 | B1 | 5/2004 | Davis et al. |
| 6,829,674 | B2 | 12/2004 | Maeda et al. |

FOREIGN PATENT DOCUMENTS

| JP | 62-179037 | 8/1987 |
| JP | 63-143689 | 6/1988 |
| JP | 4-372027 | 12/1992 |

(Continued)

*Primary Examiner*—Jack A Lane
(74) *Attorney, Agent, or Firm*—Oblon, Spivak, McClelland, Maier & Neustadt, L.L.P.

(57) ABSTRACT

A system for authenticating a memory card including: a memory card host device including a plural area authentication module which judges whether the memory card has plural storage areas, and an area switching module which switches a storage area subject to access a different storage area from among plural storage areas; a memory card including plural storage areas, at least one internal register which retains a value indicating the number of storage areas, and a controller which transmits the value indicating the number of the storage areas to the memory card host device; and a bus which transmits and receives data between the memory card host device and the memory card.

13 Claims, 6 Drawing Sheets

FOREIGN PATENT DOCUMENTS

| | | |
|---|---|---|
| JP | 6-95979 | 4/1994 |
| JP | 7-78056 | 3/1995 |
| JP | 7/141479 | 6/1995 |
| JP | 7-302175 | 11/1995 |
| JP | 8-30750 | 2/1996 |
| JP | 10-171938 | 6/1998 |
| JP | 2000-260188 | 9/2000 |
| JP | 2000-322539 | 11/2000 |
| JP | 2001-60397 | 3/2001 |
| JP | 2001-503166 | 3/2001 |
| JP | 2001-325127 | 11/2001 |
| JP | 2002-163139 | 6/2002 |
| WO | WO 02/05285 A2 | 1/2002 |

16a, 16b:MECHANICAL SWITCHES

MEMORY CARD AUTHENTICATION SYSTEM, MEMORY CARD HOST DEVICE, MEMORY CARD, STORAGE AREA SWITCHING METHOD, AND STORAGE AREA SWITCHING PROGRAM

CROSS REFERENCE TO RELATED APPLICATIONS

This application is a Continuation Application of, and claims the benefit of priority under 35 U.S.C. §120 from, U.S. application Ser. No. 11/537,766 filed Oct. 2, 2006, which is a continuation of Ser. No. 10/647,336, filed Aug. 26, 2003 which is now U.S. Pat. No. 7,143,237, and claims the benefit of priority under 35 U.S.C. §119 from prior Japanese Patent Application P2002-245863 filed on Aug. 26, 2002. The entire contents of each of the above applications are incorporated herein by reference.

BACKGROUND OF THE INVENTION

1. Field of the Invention

The present invention relates to a memory card authentication system, a memory card host device, a memory card, a storage area switching method, and a storage area switching program, which are capable of switching plural storage areas.

2. Description of the Related Art

A memory card containing a rewritable nonvolatile memory, which does not lose information saved therein even if the power supply is turned off, is a storage device for saving digital information for devices for controlling digital information, such as a digital camera, a portable music player or a personal digital assistant (such a device will be hereinafter referred to as a "memory card host device"). The memory card host device manages data on a memory with a file system such as FAT 16. The FAT 16 file system defines a cluster address in 16 bits; accordingly, assuming that a cluster size is equal to 32 kilobytes, the file system can achieve a maximum area of 2 gigabytes.

Meanwhile, a storage capacity per memory card is increasing due to advances in the memory manufacturing technology, mounting technology, and the like.

There are disclosed technologies related to memory cards, namely, a recording device which physically loads two memory cards in order to increase storage capacity (Japanese Patent Application Laid-open No. 2001-325127), a memory card which incorporates a protection switch and a protection circuit in order to protect writing (Japanese Patent Application Laid-open No. 62(1987)-179037), and the like.

A file system has a limit in terms of storage area capacity for handling. Accordingly, a conventional memory card host device which does not correspond to the switching of storage areas, has problems in that the data managed by the changed storage areas cannot be handled by changing the storage area within the memory card.

SUMMARY OF THE INVENTION

A first aspect of the present invention is to provide a system for authenticating a memory card, comprising: a) a memory card host device including a plural area authentication module which judges whether the memory card has plural storage areas, and an area switching module which switches a storage area subject to access to a different storage area among from plural storage areas; b) a memory card including plural storage areas, at least one internal register which retains a value indicating the number of storage areas, and a controller which transmits the value indicating the number of the storage areas to the memory card host device; and c) a bus which transmits and receives data between the memory card host device and the memory card.

A second aspect of the present invention is to provide a host device exchanging information with a memory card with plural storage areas in a memory card authentication system, comprising: a) a plural area authentication module which judges whether the memory card has plural storage areas; and b) an area switching module which switches a storage area subject to access a different storage area among the plural storage areas.

A third aspect of the present invention is to provide a memory card, comprising: a) plural storage areas; b) at least one internal register in which a flag indicating the number of storage areas is added to a reserved area thereof; and c) a controller which transmits the flag to a memory card host device which controls information on the storage areas.

A forth aspect of the present invention is to provide a memory card, comprising: a) plural storage areas; b) an internal register for the plural storage areas which retains a number of the plural storage areas; and c) a controller which transmits a value in the internal register for the plural storage areas to a memory card host device which controls information on the storage areas.

A fifth aspect of the present invention is to provide a memory card, comprising: a) plural storage areas; b) a mechanical switch which selects one of the plural storage areas; and c) a controller which reflects the storage area selected by the mechanical switch to an internal register.

A sixth aspect of the present invention is to provide a method for switching storage areas; comprising: a) reading a value in an internal register of a memory card by a memory card host device; b) judging whether the memory card has plural storage areas by the memory card host device; and c) switching a storage area subject to access a different storage area from among the plural storage areas by the memory card host device.

A seventh aspect of the present invention is to provide a storage area switching computer program product to be executed by a host device, the host device exchanging information with a memory card with plural storage areas in a memory card authentication system, the computer program product, comprising: a) instructions for the host device to read a value in an internal register of the memory card; b) instructions for the host device to judge whether the memory card has plural storage areas; and c) instructions for the host device to switch a storage area subject to access to a different storage area from among the plural storage areas.

DETAILED DESCRIPTION OF THE INVENTION

Figure 1:
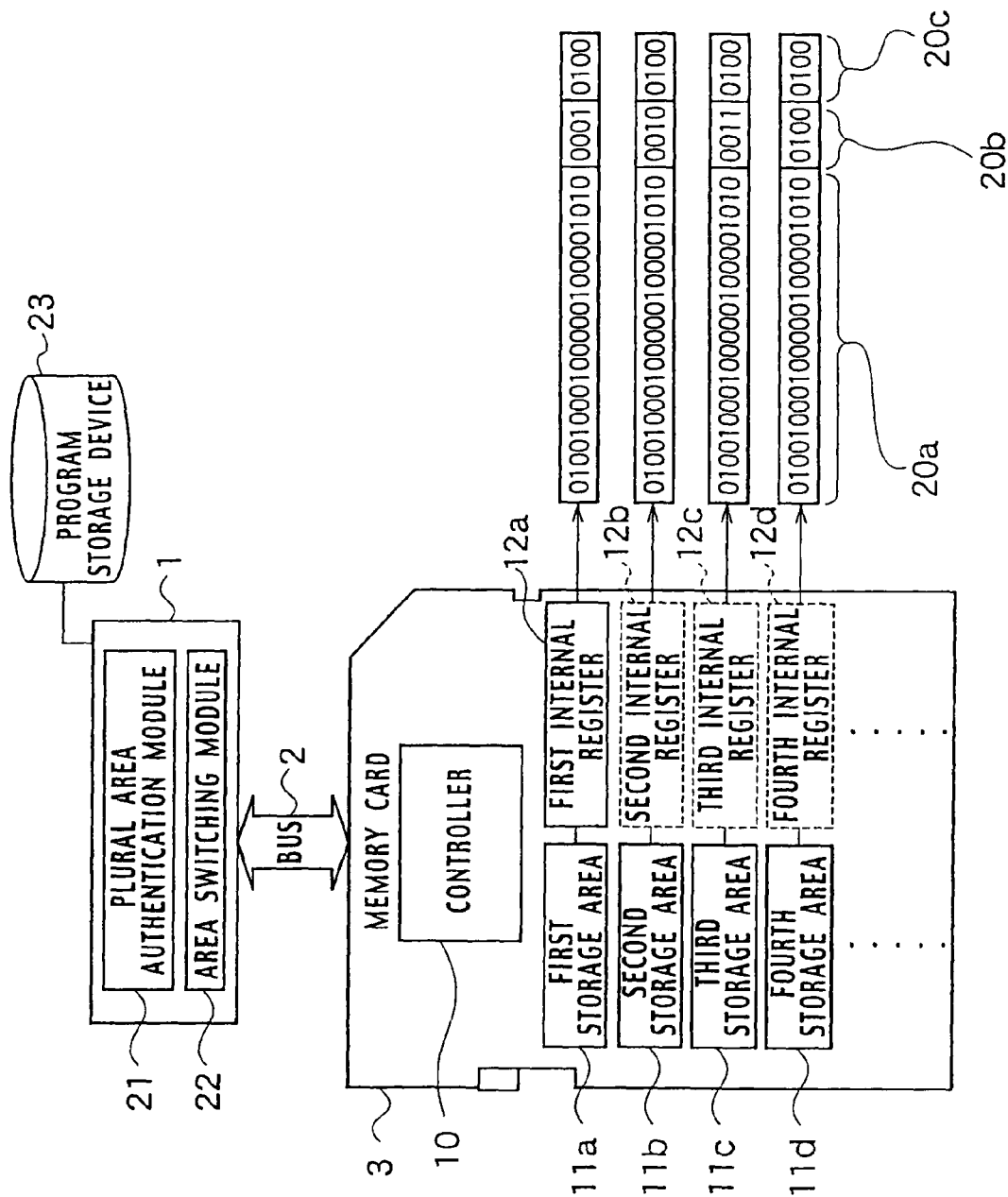
FIG. 1 is a block diagram showing a configuration of a memory card authentication system according to the first embodiment.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

First Embodiment

In the first embodiment, when a memory card host device applies a certain file system and the maximum capacity which the file system can handle is $\alpha$, then the first embodiment enables the memory card host device to handle a memory card having a total capacity larger than $\alpha$ by having a configuration with plural storage areas each having a capacity less than $\alpha$ inside the memory card enabling the handling of a total capacity larger than $\alpha$.

As shown in FIG. 1, a memory card authentication system according to the first embodiment of the present invention includes a memory card host device 1, a memory card 3, and a bus 2 for transmitting and receiving data between the memory card host device 1 and the memory card 3.

The memory card host device 1 includes a plural area authentication module 21 for judging whether or not a memory card subject to exchanging information has plural storage areas therein, and an area switching module 22 for switching a storage area subject to access to a different storage area from among plural storage areas. The memory card host device 1 includes a central processing unit (CPU), and may adopt such a configuration as to incorporate the plural area authentication module 21, the area switching module 22. These modules can be enforced by executing a dedicated program for utilizing a given programming language. Moreover, the memory card host device 1 may include a program storage device 23 for saving a storage area switching program to execute the functions of the plural area authentication module 21 and the like. It is possible to allow the memory card host device 1 to execute a procedure for reading out internal register values of the memory card and a procedure for judging whether or not the memory card has plural storage areas by means of reading out the storage area switching program from the program storage device 23. The program storage device 23 may be an internal storage device such as a random access memory (RAM), or an external storage device such as a hard disk (HD) or a floppy disk (FD). It is easy to save, carry and sell programs by use of the storage device which saves the above-described program. To be more precise, the memory card host device 1 may be a digital camera, a portable music player, a personal digital assistant, a car navigation system, a cellular telephone, a silicon audio player, an electronic dictionary, or the like.

The memory card 3 includes plural storage areas 11a, 11b, 11c, 11d, and so on, at least one internal register 12a with a flag indicating the quantity of the storage areas added to a reserved area thereof, and a controller 10 for transmitting the flag to the memory card host device 1 which controls information in the storage areas. The controller 10 receives a command and data from the memory card host device 1 through the bus 2, and controls the storage areas based on the command and the data to the memory card. Moreover, the controller 10 responds to the command from the memory card host device 1 and transmits the data. Each of the storage areas 11a, 11b, 11c, 11d, and so on represents a storage area which can be managed by a single file system. The size thereof does not exceed the marginal capacity which can be handled by a single file system. For example, when the FAT 16 is used as the file system, the marginal capacity is equal to 2 gigabytes. In this event, the marginal capacity of the entire memory card is equivalent to 8 gigabytes when the memory card includes four storage areas as shown in FIG. 1, and is 10 gigabytes when the memory card includes five storage areas or 12 gigabytes when the memory card includes six storage areas. Internal registers 12a, 12b, 12c, 12d, and so on indicate characteristics such as the capacity of the memory card 3. The internal register is necessary for at least one storage area, and other storage areas need internal registers when the characteristics of the storage areas are different or when the number information which indicates areas provided within the internal register is added. Although internal registers are provided to the respective storage areas in FIG. 1, an internal register can be provided only to the first storage area 11a.

To be specific, the memory card 3 corresponds to a secure digital (SD) memory card, as an example, which has dimensions of 24×32×2.1 mm and a copyright protection function corresponding to the secure digital music initiative (SDMI) standard, and is upward compatible with a multimedia card (MMC). The SD memory card is a memory card based on the SDMI standard which has been jointly developed by three companies Toshiba Corporation, Matsushita Electric Industrial Co., Ltd., and SanDisk Corporation. In the SD memory card, the internal registers 12a, 12b, 12c, 12d, and so on are referred to as CSD registers. Meanwhile, the SD memory card basically applies the FAT 16 file system which is defined by ISO/IEC 9293.

According to the memory card of the first embodiment, it is possible to handle a storage capacity larger than the marginal capacity of the file system by means of providing plural storage areas. Moreover, since the memory card host device is required to correspond only to a single control method of the file system, it is possible to simplify the configuration of the memory card host device.

Next, an area switching method according to the first embodiment will be described with the use of FIG. 2.

a) First, in Step S101, the memory card host device reads out a value of the internal register of the memory card.

b) Next, in Step S102, the memory card host device judges whether or not the memory card has plural storage areas. As the method of judgment, there is a method of judging by a flag in a conventional reserved area of an internal register, a method of judging by an internal register for plural storage areas, and the like. Each of the judging methods will be described later. When a judgment is made in Step S102 that the memory card does not have plural storage areas, then the process moves to Step S103, and where a judgment is made that there is only a single storage area, then normal processing takes place. When a judgment is made in Step S102 that the memory card has plural storage areas, then the process moves to Step S104.

c) Next, in Step S104, the memory card host device switches the storage area so as to refer to a desired storage area. The switching method includes a method of switching by command, a method of switching by address, and the like. Each of the switching methods are described later.

d) Next, in Step S105, the memory card host device judges whether or not the area has been switched normally. The method of judgment may be a method of confirming by reading the value of the internal register, or a method of confirming by a response from the memory card relative to the command from the host. When the area has not been switched normally, the process moves to Step S106 and error processing takes place. When the area has changed normally, the process moves to Step S107 and data processing of the memory card by the memory card host device is performed.

According to the area switching method of the first embodiment, it is possible to handle a storage capacity larger than the marginal capacity of the file system by switching to the plural storage areas which are included in the memory card.

Next, explanation is made regarding a method of judging that the memory card host device is a memory card having plural storage areas. The method for judging that the memory card has plural storage areas includes the method of adding a flag to a conventional reserved area inside an internal register, and the method of adding an internal register for the plural storage areas.

(Adding a Flag to a Conventional Reserved Area)

FIG. 1 shows the conventional memory card, in which flags are added to conventional reserved areas. Each of the internal registers 12a, 12b, 12c, and 12d of the memory card 3 includes first to third bit strings 20a, 20b, and 20c. In the following, explanation is made regarding the contents of the bit strings while taking an SD memory card as an example. The first bit string 20a equivalent to the first 23 bits of the internal register indicates a characteristic of the memory card 3. This is the same as the conventional memory card. The second bit string 20b equivalent to 4 bits subsequent to the first bit string is a conventional reserved area of the internal register. Information indicating the corresponding storage area number is added hereto. In the memory card 3 shown in FIG. 1, a flag indicating "1" is set to the second bit string of the first internal register 12a corresponding to the first storage area 11a, a flag indicating "2" is set to the second bit string of the second internal register corresponding to the second storage area 11b, a flag indicating "3" is set to the second bit string of the third internal register corresponding to the third storage area 11c, and a flag indicating "4" is set to the second bit string of the fourth internal register corresponding to the fourth storage area 11d. The third bit string 20c equivalent to 4 bits subsequent to the second bit string is also a conventional reserved area of the internal register. Information indicating the quantity of the storage areas is added hereto. In the memory card 3 shown in FIG. 1, a flag indicating "4" is set to each of the third bit strings of the internal registers 12a, 12b, 12c, and 12d when the memory card 3 has four storage areas. Meanwhile, a flag indicating "5" will be set to each of the third bit strings of the internal registers 12a, 12b, 12c, and 12d when the memory card 3 has five storage areas.

In the case of judging plural areas as described above, flags representing the existence of the plural areas are added to the second and the third bit strings which are the conventional reserved areas. The plural area authentication module 21 of the memory card host device 1 issues a command to read out the internal registers 12a, 12b, 12c, and 12d, and the controller 10 receives the command. The controller 10 transmits the contents of the internal registers 12a, 12b, 12c, and 12d to the memory card host device 1 as a response to the command. The memory card host device 1 refers to the reserved areas (the second and the third bit strings) in accordance with the response from controller 10 and interprets the flags. Accordingly, the memory card host device 1 can recognize the existence of the plural areas and the quantity of the areas. A conventional memory card host device which cannot interpret the flags will handle only the first storage area 11a in a conventional manner.

According to this judging method, it is possible to judge whether or not the memory card has plural storage areas with the use of conventional reserved areas of the internal registers.

(Adding the Internal Register for Plural Storage Areas)

Figure 3:
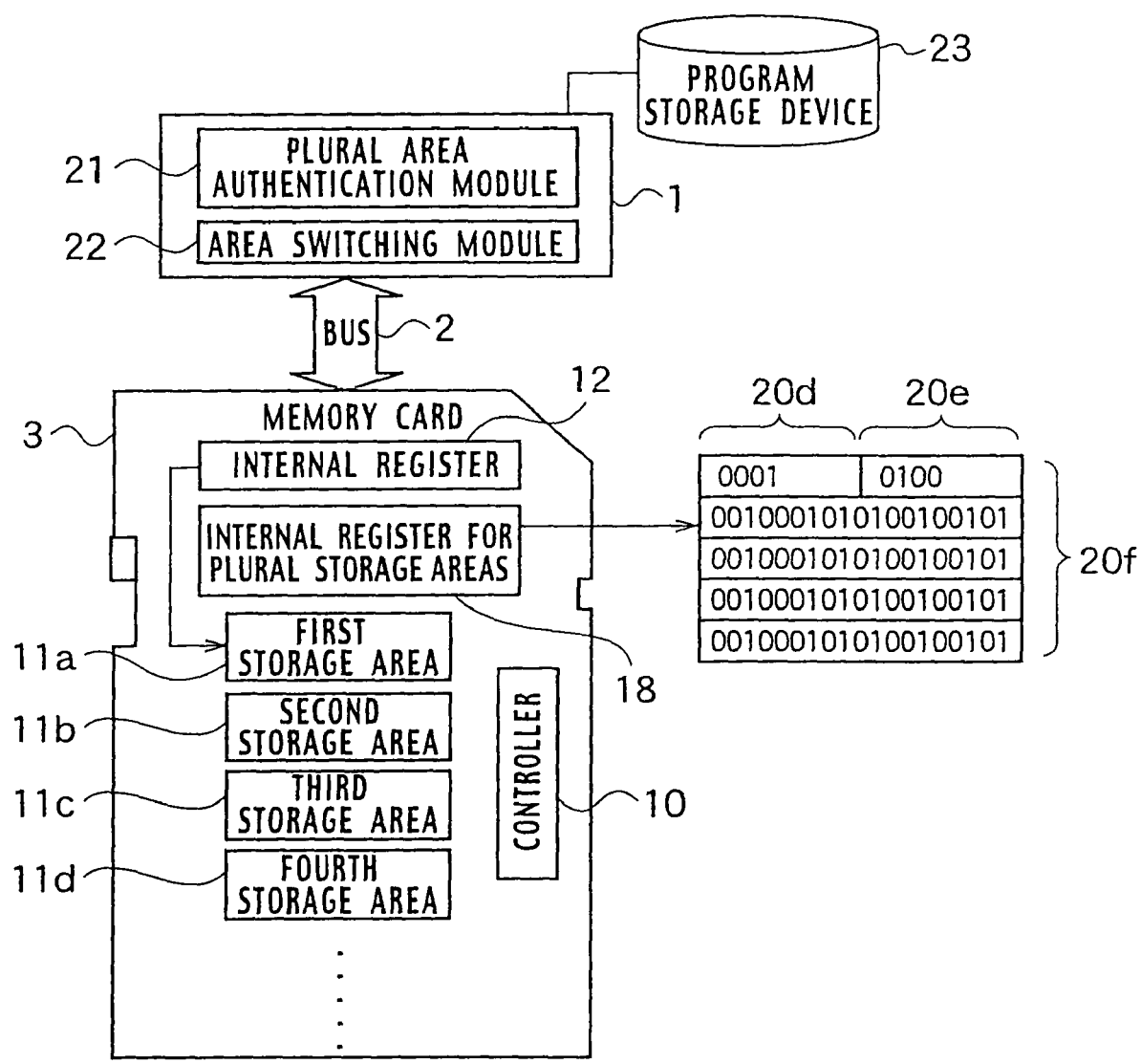
FIG. 3 is another block diagram describing the configuration of the memory authentication system according to the first embodiment.

FIG. 3 shows a memory card including the internal register for plural storage areas. The internal register 12 of the memory card 3 serves for authenticating information relative to the first storage area 11a, which can be authenticated by the conventional memory card host device. The internal register 18 for the plural storage areas retains the quantity of all the areas inside the memory card 3 and a flag indicating the area which is currently selected. The internal register 18 for the plural storage areas includes the fourth to sixth bit strings. In the following, the contents of the bit strings will be described while taking the SD memory card as an example. The fourth bit string 20d equivalent to the first 4 bits of the internal register 18 for the plural areas indicates the area which the controller 10 currently judges as the storage area. The fifth bit string 20e subsequent to the fourth bit string 20d indicates the quantity of the storage areas possessed by the memory card 3. The sixth bit string 20f subsequent to the fifth bit string 20e stores a bit string of information concerning each of the areas.

The plural area authentication module 21 of the memory card host device 1 issues a command to read out the internal register 18 for the plural storage area, and the controller 10 receives the command. The controller 10 transmits the contents of the internal register 18 for the plural storage areas to the memory card host device 1 as a response to the command. The memory card host device 1 refers to the value of the internal register 18 for the plural storage areas in accordance with the response from the controller 10. Accordingly, the memory card host device 1 can recognize the existence of the plural areas and the quantity of these areas. A conventional memory card host device will handle only the first storage area 11a with the conventional internal register 12 in a conventional manner.

According to this judging method, it is possible to judge whether or not the memory card has plural storage areas by adding a new internal register.

Next, explanation is made regarding the method of switching storage areas by the memory card host device. The method of switching areas by the memory card host device includes a switching method by a newly added command, and a switching method by a designated address.

(Area Switching Method by Command)

Figure 4A:
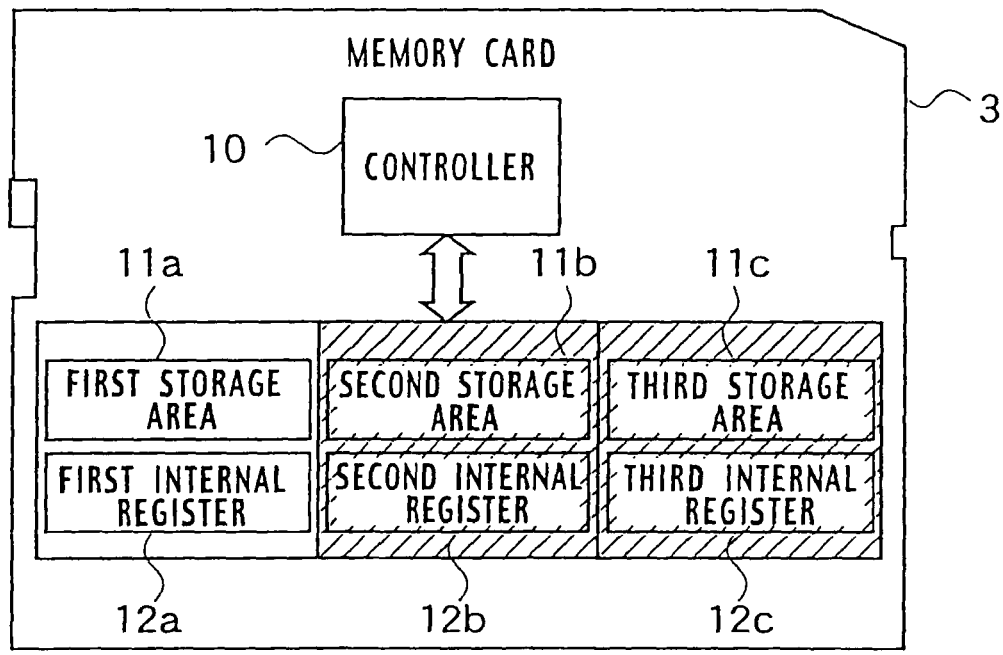
FIGS. 4A and 4B are schematic diagrams showing the area switching method by command according to the first embodiment.
Figure 4B:
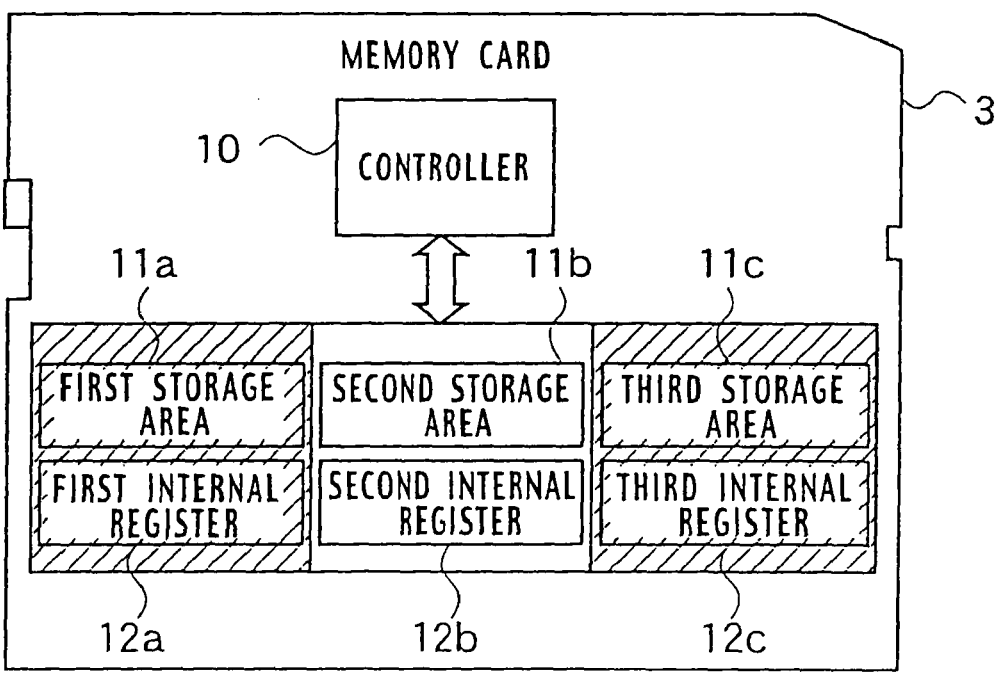

FIGS. 4A and 4B show memory cards which are capable of switching storage areas by a command issued by a memory card host device.

The memory card 3 as shown in FIG. 4A is in a state where the power supply is turned on. In this event, it is possible to handle the first storage area 11a. In FIGS. 4A and 4B, shaded areas represent storage areas which the memory card host device cannot handle. Accordingly, areas without shades represent storage areas which the memory card host device can handle. The plural area authentication module 21 (see FIG. 1 or FIG. 3) of the memory card host device 1 judges the existence of plural storage areas with the use of the value readout. When plural storage areas exist, the area switching module 22 (see FIG. 1 or FIG. 3) of the memory card host device 1 issues the command to switch storage areas. It is possible to provide the command with an argument including either a bit string indicating the storage area to be changed to, or a flag indicating an increase in the storage area from the storage area currently referred to and a flag indicating a decrease therefrom. When the command for switching the area to the second storage area 11b is issued and the storage area is thereby changed normally, the status moves to that as in FIG. 4B.

In a memory card host device which cannot perform the above-described processing, the memory card remains in the state as shown in FIG. 4A when the power supply is turned on. Accordingly, such a memory card host device handles the memory card as the memory card having only the first storage area 11a.

Meanwhile, FIGS. 4A and 4B show the memory card 3 in which the plural storage areas 11a, 11b, 11c, and 11d include the internal registers 12a, 12b, 12c, and 12d, respectively. However, needless to say, that the memory card 3 may include the internal register 18 for the plural storage areas as shown in FIG. 3 instead.

According to this area switching method, it is possible to handle the plural storage areas by issuing the command from the memory card host device.

(Area Switching Method by Address)

Figure 5:
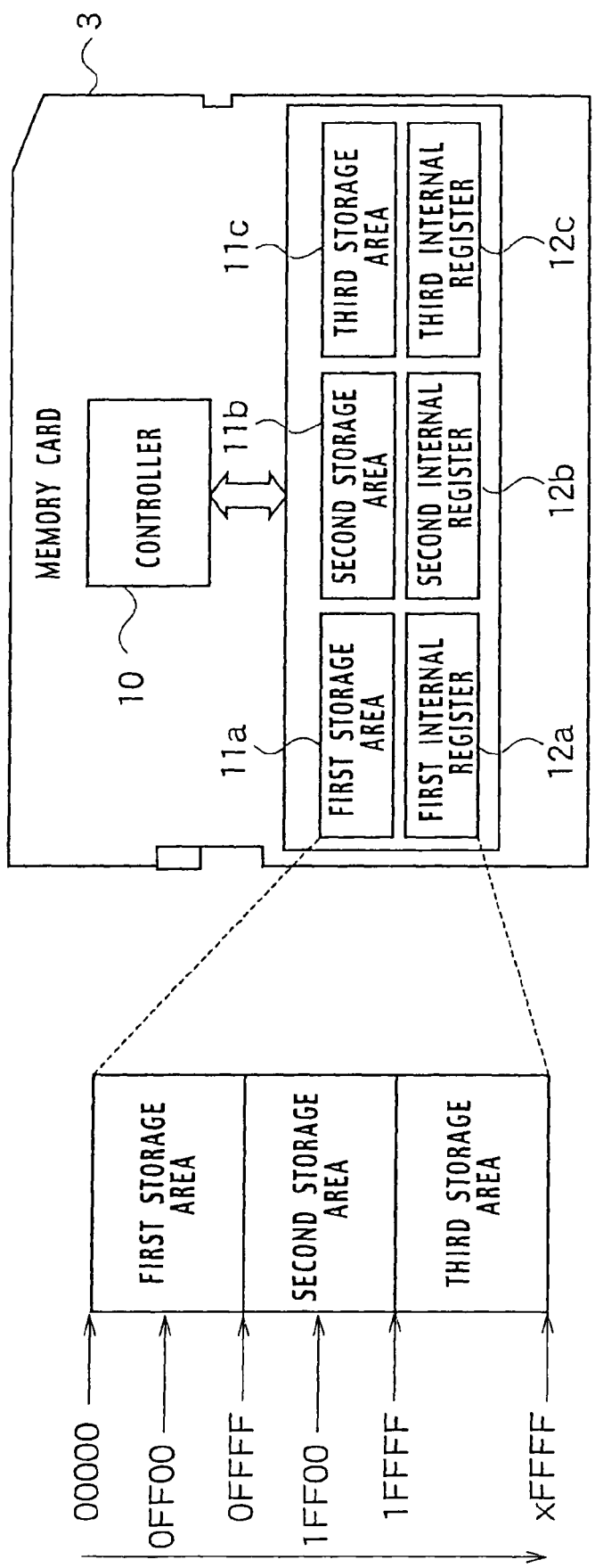
FIG. 5 is a schematic diagram showing the area switching method by address according to the first embodiment.

FIG. 5 shows the memory card 3 which is arranged to switch the area by address designated by the memory card host device. In the event of reading out and writing from the memory card host device, the controller 10 performs automatic processing for switching areas in accordance with an address designated to the memory card by the area switching module 22 (see FIG. 1 or FIG. 3) of the memory card host device 1. In this way, it is possible to change the area without being conscious thereof.

In FIG. 5, the first storage area 11a occupies a hexadecimal address from 00000 to 0FFFF. The second storage area 11b occupies an address from 0FFFF to 1FFFF. Here, if an address at 0FF00 is designated by the memory card host device as shown in FIG. 5, the first storage area 11a is automatically selected by the controller 10. Similarly, if an address at 1FF00 is designated, the second storage area 11b is automatically selected. In a conventional memory card host device which does not correspond to address designation, the addresses for the second storage area 11b and the third storage area 11c do not exist. Accordingly, the conventional memory card host device handles only the first storage area 11a.

Here, in the event of issuing the command for designating an address, it is conceivable that an address for an argument exceeds the command length. Accordingly, certain bytes are expressed as one block so as to correspond to a large storage capacity without changing the command format length.

For example, in the SD memory card, the command length accounts for 48 bits, of which 6 bits are used for the contents of the command and 32 bits are used for the argument. With the use of this argument of 32 bits, it is only possible to express up to 4 gigabytes (=$2^{32}$ bytes) when applying the address which defines 1 byte as 1. In order to correspond to the large-capacity memory card, the memory card host device according to the first embodiment transmits a command to the memory card for modifying an address indication from a byte unit to a block unit. Thereafter, the memory card host device issues a command using the block address as the argument. For example, when a command treating 512 bytes as one block is issued from the memory card host device, it is possible to correspond to a storage capacity equal to 512 times 4 gigabytes. Assuming that each of the storage areas has a capacity of 2 gigabytes in FIG. 5, a conventional command length can only express an address up to the second storage area 11b. However, with the use of the address expressed with blocks enables expression of a large-capacity address.

Moreover, FIG. 5 shows the memory card 3 in which the plural storage areas 11a, 11b, and 11c severally include the internal registers 12a, 12b, and 12c. However, needless to say, the memory card 3 may include the internal register 18 for the plural areas as shown in FIG. 3 instead.

According to this area switching method, it is not necessary to change the command length. Therefore, it is possible to express large-capacity addresses without changing the hardware of the device for transmitting and receiving the command.

As described above, according to the first embodiment of the present invention, it is possible to provide the memory card authentication system, the memory card, the memory card host device, the area switching method, and the area switching program, which are capable of switching the plural storage areas.

Second Embodiment

In the second embodiment, description will be made regarding a large-capacity memory card having plural storage areas adopting different file systems.

Figure 6:
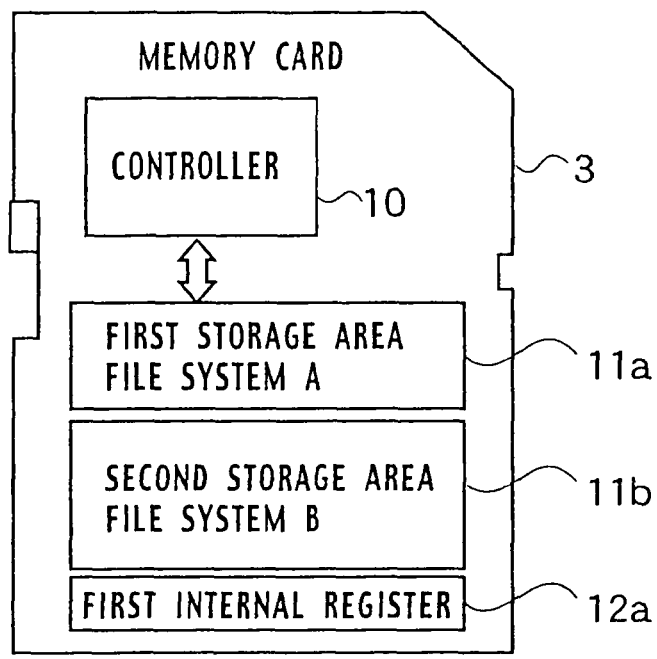
FIG. 6 is a block diagram showing a configuration of a memory card according to the second embodiment.

As shown in FIG. 6, the memory card according to the second embodiment includes two or more storage areas. FIG. 6 shows a memory card 3 which includes two storage areas 11a and 11b. The first storage area 11a is managed by a file system A, and a capacity of the storage area is assumed to be a capacity amount a, which is smaller than a marginal capacity of the file system A. The second storage area 11b is managed by a file system B, and a capacity of the storage area is assumed to be a capacity amount b, which is smaller than a marginal capacity of the file system B. When a power supply is turned on, the first storage area 11a is handled. Accordingly, a memory card host device which does not correspond to the above-described configuration can handle only the first storage area 11a.

The first storage area 11a, which is the storage area when the power is turned on, is managed by the file system A that can be handled by a conventional memory card host device. Accordingly, in the second storage area 11b, it is efficient to use the file system B which handles a larger storage capacity than the file system A does. In other words, it is desirable that the capacity amount b is greater than the capacity amount a.

Figure 2:
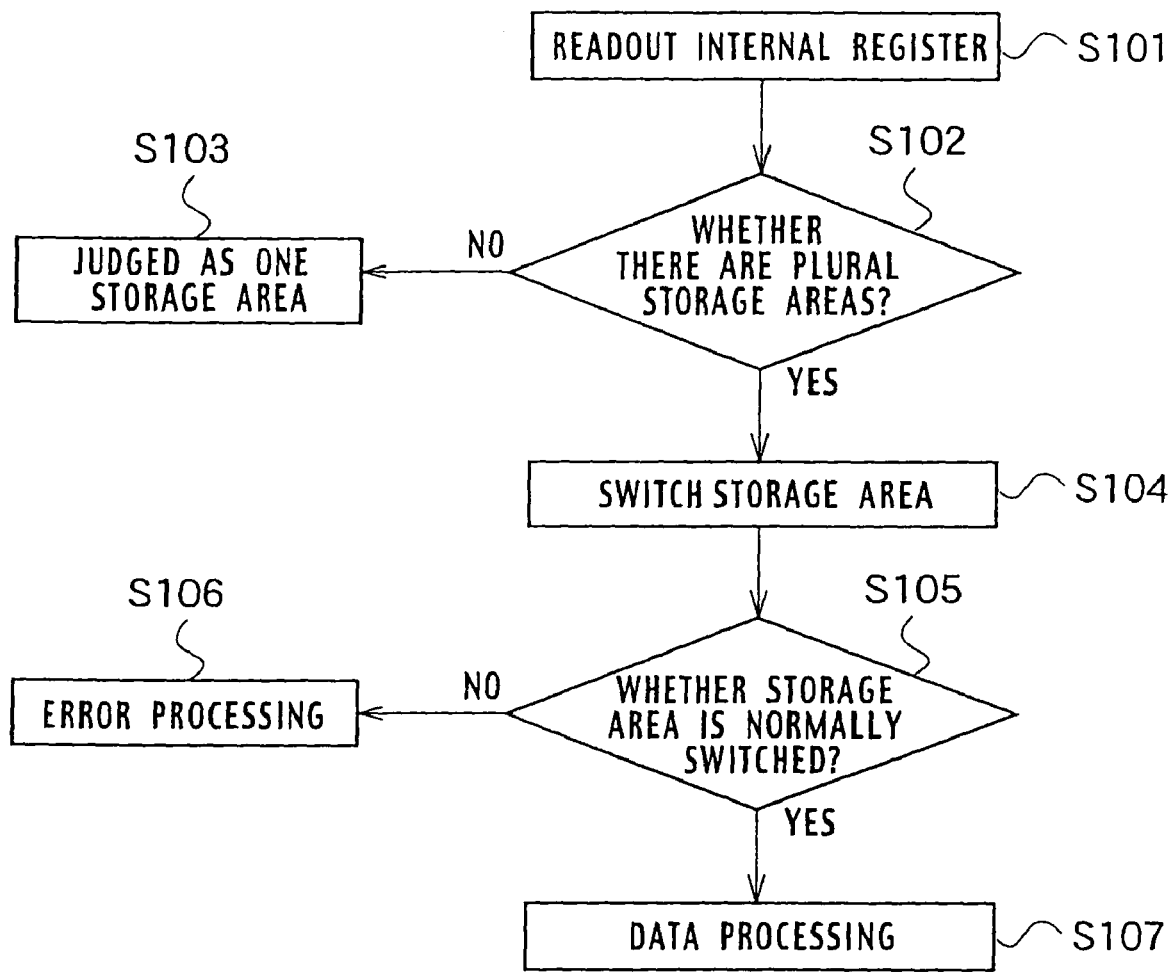
FIG. 2 is a flowchart showing an area switching method according to the first embodiment.

Since the method of switching storage areas is similar to that in FIG. 2, which has been described in the first embodiment, the description thereof will be omitted herein. Moreover, although FIG. 6 schematically shows a single internal register 12a, it is acceptable if the memory card 3 includes the plural internal registers 12a, 12b, 12c, and 12d for the respective plural storage areas as shown in FIG. 1. Alternatively, it is also acceptable that the memory card 3 includes the internal register 18 for the plural storage areas as shown in FIG. 3.

According to the memory card of the second embodiment, when there are plural storage areas, it is possible to maintain compatibility with a conventional memory card host device by setting the storage area having the file system that can be controlled by the conventional memory card host device as the storage area accessible when the power supply is turned on. Regarding the other storage areas, it is possible to moderate limitations of the storage capacities by changing the file systems thereof into file systems adopting new methods.

Third Embodiment

In the third embodiment, description will be made regarding a large-capacity memory card which is arranged to switch plural storage areas with the use of mechanical switches provided on a housing.

Figure 7:
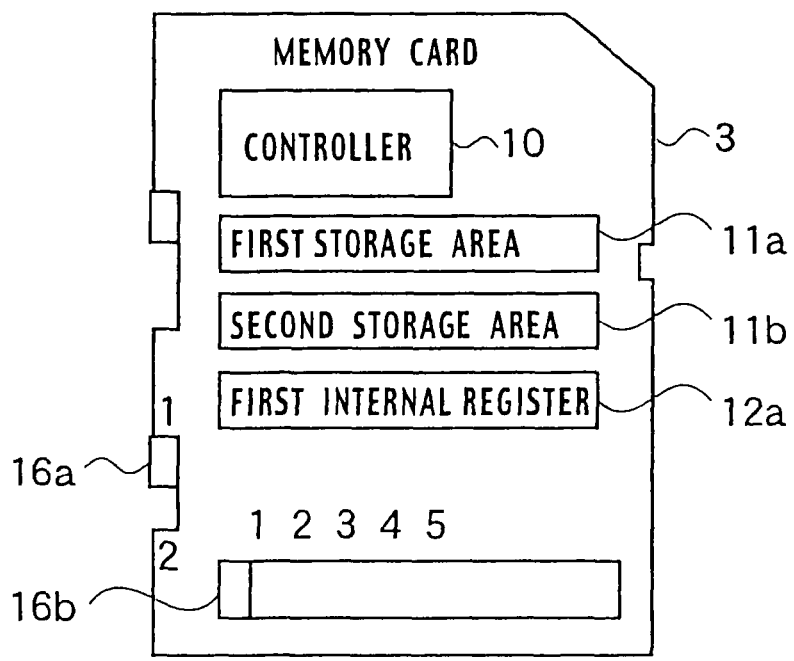
FIG. 7 is a block diagram showing a configuration of a memory card according to the third embodiment.

As shown in FIG. 7, the memory card according to the third embodiment includes plural storage areas 11a and 11b, mechanical switches 16a and 16b for selecting one of the plural storage areas, and a controller 10 for reflecting the storage area selected by the mechanical switches 16a and 16b to an internal register 12a. It is possible to select any one of the storage areas 11a and 11b of the memory card 3 by use of the mechanical switches 16a and 16b provided on the housing of the memory card 3. For example, when the mechanical switches 16a and 16b are set to positions marked as "1", the controller 10 reflects the state of the switches to the first internal register 12a, thereby allowing a memory card host device to handle the first storage area 11a. Similarly, when the mechanical switches 16a and 16b are set to positions marked as "2", the controller 10 reflects the state of the switches to the internal register 12a, thereby allowing the memory card host device to handle the second storage area 11b. Although FIG. 7 schematically shows the single internal register 12a, it is acceptable if the memory card 3 includes the plural internal registers 12a, 12b, 12c, and 12d for the respective plural storage areas as shown in FIG. 1. Alternatively, it is also acceptable that the memory card 3 includes the internal register 18 for the plural storage areas as shown in FIG. 3.

According to the memory card of the third embodiment, it is possible to switch storage areas without adding a new function to the memory card host device if a user designates the storage area by use of mechanical switches. Therefore, it is possible to use all the storage capacity included in the memory card.

Other Embodiments

Although the present invention has been described above with reference to the first to third embodiments, it is to be understood that the present invention shall not be limited to the descriptions and the drawings which constitute a part of this disclosure. It is obvious to those skilled in the art that various modifications, alterations, and improvements become possible from the teachings of this disclosure.

For example, although the memory cards 3 according to the first to third embodiments of the present invention have been illustrated by the drawings including two to four storage areas therein, needless to say, the memory card 3 may include more than four storage areas.

Incidentally, regarding the memory card host device according to the embodiment of the present invention, the storage area currently handled is stored in the internal register of the memory card. In this way, when the memory card is used in a conventional memory card host device after the power is once turned off, it is possible to access the storage area set by the memory card host device of the embodiment of the present invention.

Various modifications will become possible for those skilled in the art after receiving the teachings of the present disclosure without departing from the scope thereof.

What is claimed is:

1. A method for operating a storage device configured to be connectable to a host device and having at least a first storage area and a second storage area being different from the first storage area, the method comprising:
   receiving a first command;
   accessing to the first storage area by the first command;
   receiving a second command indicating to switch the storage areas;
   switching to access to the second storage area from the first storage area by the second command; and
   accessing the second storage area if successfully switched wherein a register includes at least one of a bit string indicates an area which the host device judges as storage areas, a bit string indicates a quantity of storage areas possessed by the storage device, and a bit string of information concerning each of storage areas.

2. The method for operating the storage device according to claim 1, wherein each of the first and second storage areas has an internal register therein, respectively.

3. The method for operating the storage device according to claim 1, wherein the storage device has a single register for the first and second storage areas.

4. The method for operating the storage device according to claim 1, further comprising:
   judging whether the storage device has plural storage areas the host device.

5. The method for operating the storage device according to claim 4, wherein judging whether the storage device has plural storage areas includes judging by a flag in a reserved area of an internal register of the storage device, the flag being received from the storage device and retaining a number of the storage areas.

6. The method for operating the storage device according to claim 4, wherein judging whether the storage device has plural storage areas includes judging by a value in an internal register for the plural storage areas of the storage device, the value being received from the storage device and retaining a number of the storage areas.

7. The method for operating the storage device according to claim 1, wherein switching to access to the second storage area from the first storage area includes switching by use of a command including, as an argument, a bit series indicating the second storage area to be switched to, or a flag indicating an increase or a decrease to the second storage area to be switched to from the first storage area currently referred to.

8. A method for operating a storage device configured to be connectable to a host device and having at least a register, a first storage area and a second storage area being different from the first storage area, the method comprising:
   receiving a first address;
   accessing to the first storage area designated by the first address;
   receiving a second address;
   switching to access to the second storage area designated by the second address from the first storage area, the second address being different from the first address; and
   accessing the second storage area if successfully switched,
   wherein the register includes at least one of a bit string indicates an area which the host device judges as storage areas, a bit string indicates a quantity of storage areas possessed by the storage device, and a bit string of information concerning each of storage areas.

9. The method for operating the storage device according to claim 8, wherein the storage device has a register.

10. The method for operating the storage device according to claim 9, wherein each of the first and second storage areas has an internal register therein, respectively.

11. The method for operating the storage device according to claim 9, wherein the storage device has a single register for the first and second storage areas.

12. The method for operating the storage device according to claim 8, wherein switching to access to the second storage area from the first storage area includes switching by use of a command including an address of the second storage area to be switched to as an argument.

13. The method for operating the storage device according to claim 8, wherein switching to access to the second storage area from the first storage area includes switching by use of a command including an address in a block unit as an argument, the block unit being set by defining a given number of bytes as one block.

* * * * *